United States Patent
Madasamy

(10) Patent No.: US 9,674,193 B1
(45) Date of Patent: Jun. 6, 2017

(54) AGGREGATION AND DISBURSEMENT OF LICENSES IN DISTRIBUTED NETWORKS

(71) Applicant: Juniper Networks, Inc., Sunnyvale, CA (US)

(72) Inventor: Siva Madasamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 846 days.

(21) Appl. No.: 13/954,311

(22) Filed: Jul. 30, 2013

(51) Int. Cl.
| | |
|---|---|
| H04L 12/24 | (2006.01) |
| H04L 29/08 | (2006.01) |
| H04L 29/14 | (2006.01) |
| G06F 11/20 | (2006.01) |
| H04L 29/06 | (2006.01) |
| H04L 12/26 | (2006.01) |

(52) U.S. Cl.
CPC .......... *H04L 63/10* (2013.01); *G06F 11/2025* (2013.01); *G06F 11/2028* (2013.01); *H04L 41/0654* (2013.01); *H04L 41/0663* (2013.01); *H04L 41/0668* (2013.01); *H04L 67/1034* (2013.01); *H04L 69/40* (2013.01); *H04L 12/2668* (2013.01); *H04L 12/2671* (2013.01)

(58) Field of Classification Search
CPC ....... H04L 63/10; H04L 1/22; H04L 67/1034; H04L 69/40; H04L 12/2892; H04L 49/25; H04L 49/28; H04L 49/22; H04L 41/0654; H04L 41/0663; G06F 21/105
See application file for complete search history.

(56) References Cited

U.S. PATENT DOCUMENTS

| | | | | |
|---|---|---|---|---|
| 6,741,572 B1 * | 5/2004 | Graves | .................. | H04L 41/082 370/229 |
| 6,970,944 B2 * | 11/2005 | Johnson | .............. | H04L 63/0209 370/351 |
| 7,345,991 B1 * | 3/2008 | Shabtay | .............. | H04L 12/2863 370/221 |
| 7,373,660 B1 * | 5/2008 | Guichard | ................ | H04L 47/10 726/15 |
| 7,961,599 B2 * | 6/2011 | Proulx | ................ | H04L 12/4633 370/218 |
| 8,126,814 B2 * | 2/2012 | Yellai | ..................... | G06F 21/105 705/56 |
| 8,516,090 B1 * | 8/2013 | Welch | ..................... | G06F 21/10 709/221 |

(Continued)

*Primary Examiner* — Eleni Shiferaw
*Assistant Examiner* — Nelson Giddins
(74) *Attorney, Agent, or Firm* — Cooley LLP

(57) ABSTRACT

An apparatus includes an aggregation module that is associated with a first network core and that is operatively coupled to a second network core and a third network core. The aggregation module is configured to receive a first copy of an access point license that authorizes access to a network via an access point and the second network core. The aggregation module receives the first copy of the access point license from the second network core in response to an installation and validation of the access point license on the second network core. The aggregation module is configured to send a second copy of the access point license to the third network core that authorizes a device to access the network via the access point and via the third network core in accordance with the access point license and in response to a failure of the second network core.

18 Claims, 4 Drawing Sheets

(56) References Cited

U.S. PATENT DOCUMENTS

| | | | | |
|---|---|---|---|---|
| 8,693,344 B1* | 4/2014 | Adams | H04L 49/65 | 370/241 |
| 8,724,456 B1* | 5/2014 | Hong | G06F 11/00 | 370/225 |
| 8,780,699 B1* | 7/2014 | Hasan | H04L 1/22 | 370/219 |
| 8,995,303 B1* | 3/2015 | Brar | H04L 45/02 | 370/254 |
| 9,135,409 B2* | 9/2015 | Xia | G06F 21/10 | |
| 9,148,381 B2* | 9/2015 | Dunlap | H04L 47/2441 | |
| 2002/0071427 A1* | 6/2002 | Schneider | H04L 12/5601 | 370/352 |
| 2002/0120763 A1* | 8/2002 | Miloushev | G06F 17/30197 | 709/230 |
| 2002/0188756 A1* | 12/2002 | Weil | H04L 41/0668 | 709/240 |
| 2003/0093252 A1* | 5/2003 | Frankel | G06F 11/261 | 703/13 |
| 2004/0006650 A1* | 1/2004 | Theimer | G06F 9/542 | 719/313 |
| 2004/0010440 A1* | 1/2004 | Lenard | G06F 21/105 | 705/59 |
| 2005/0149754 A1* | 7/2005 | Rasanen | H04L 29/12066 | 726/4 |
| 2006/0098577 A1* | 5/2006 | MeLampy | H04L 29/06027 | 370/238 |
| 2006/0155912 A1* | 7/2006 | Singh | G06F 9/5088 | 711/6 |
| 2006/0168111 A1* | 7/2006 | Gidwani | H04L 63/0892 | 709/218 |
| 2006/0248017 A1* | 11/2006 | Koka | G06F 21/105 | 705/59 |
| 2007/0147374 A1* | 6/2007 | Lee | H04L 12/1877 | 370/390 |
| 2007/0159963 A1* | 7/2007 | Qing | H04L 41/0668 | 370/228 |
| 2007/0255813 A1* | 11/2007 | Hoover | G06F 9/5061 | 709/223 |
| 2007/0291734 A1* | 12/2007 | Bhatia | H04L 29/06027 | 370/352 |
| 2008/0082450 A1* | 4/2008 | Grimm | G06F 21/10 | 705/59 |
| 2008/0130491 A1* | 6/2008 | Chao | H04L 45/00 | 370/225 |
| 2008/0189769 A1* | 8/2008 | Casado | G06F 21/6281 | 726/4 |
| 2008/0222159 A1* | 9/2008 | Aranha | G06F 17/30289 | |
| 2009/0097453 A1* | 4/2009 | Weniger | H04W 8/087 | 370/331 |
| 2009/0222926 A1* | 9/2009 | Pavan | G06F 21/10 | 726/26 |
| 2009/0313311 A1* | 12/2009 | Hoffmann | G06F 11/2094 | |
| 2010/0071024 A1* | 3/2010 | Eyada | H04L 63/0263 | 726/1 |
| 2010/0293272 A1* | 11/2010 | Karunakaran | H04W 24/04 | 709/224 |
| 2010/0318881 A1* | 12/2010 | Limber | G06F 21/10 | 714/758 |
| 2011/0162062 A1* | 6/2011 | Kumar | G06F 21/10 | 726/15 |
| 2012/0042197 A1* | 2/2012 | Peng | G06F 11/2035 | 714/4.12 |
| 2012/0106552 A1* | 5/2012 | Iwao | H04L 45/36 | 370/392 |
| 2012/0144226 A1* | 6/2012 | Yang | H04L 41/0672 | 714/2 |
| 2012/0185593 A1* | 7/2012 | Zhu | G06F 21/105 | 709/224 |
| 2012/0230336 A1* | 9/2012 | Nishiyama | H04L 45/741 | 370/392 |
| 2013/0060819 A1* | 3/2013 | Lambeth | H04L 12/4633 | 707/803 |
| 2013/0067075 A1* | 3/2013 | Laksman | H04L 41/0893 | 709/224 |
| 2013/0103827 A1* | 4/2013 | Dunlap | H04L 41/0816 | 709/224 |
| 2013/0133030 A1* | 5/2013 | Xue | H04L 63/10 | 726/1 |
| 2013/0188514 A1* | 7/2013 | Jain | H04L 61/103 | 370/254 |
| 2013/0188521 A1* | 7/2013 | Jain | H04L 12/185 | 370/255 |
| 2013/0219063 A1* | 8/2013 | Frank | G01S 5/0252 | 709/225 |
| 2013/0239194 A1* | 9/2013 | Raleigh | G06Q 10/06375 | 726/7 |
| 2013/0326062 A1* | 12/2013 | Ryner | H04L 67/14 | 709/225 |
| 2014/0012721 A1* | 1/2014 | Chittigala | G06F 9/50 | 705/35 |
| 2014/0023074 A1* | 1/2014 | Mishra | H04L 12/4641 | 370/390 |
| 2014/0050078 A1* | 2/2014 | Sato | H04L 41/0654 | 370/228 |
| 2014/0059200 A1* | 2/2014 | Nguyen | H04L 43/026 | 709/224 |
| 2014/0219081 A1* | 8/2014 | Natarajan | H04L 41/0659 | 370/228 |
| 2014/0222989 A1* | 8/2014 | Tanaka | H04L 41/20 | 709/224 |
| 2014/0269683 A1* | 9/2014 | Bhagavathiperumal | H04L 49/25 | 370/355 |
| 2014/0304499 A1* | 10/2014 | Gopinath | H04L 63/168 | 713/151 |
| 2014/0344326 A1* | 11/2014 | Kamath | H04L 67/1008 | 709/203 |
| 2014/0355416 A1* | 12/2014 | Keesara | H04L 45/127 | 370/219 |
| 2015/0188753 A1* | 7/2015 | Anumala | H04L 41/12 | 370/225 |
| 2015/0222452 A1* | 8/2015 | Ng | H04L 12/6418 | 370/392 |
| 2015/0242599 A1* | 8/2015 | Chowdhury | G06F 21/105 | 714/4.11 |
| 2015/0365344 A1* | 12/2015 | Manral | H04L 47/17 | 370/237 |
| 2016/0117197 A1* | 4/2016 | Luo | G06F 9/4806 | 718/104 |

\* cited by examiner

AGGREGATION AND DISBURSEMENT OF LICENSES IN DISTRIBUTED NETWORKS

BACKGROUND

Embodiments described herein relate generally to network access and, more particularly, to aggregation and distribution of network licenses in a distributed network.

The number of electronic devices connected to networks is ever increasing. In some distributed networks, licenses are sold that authorize one or more electronic devices access to at least a portion of the network. For example, in some instances, licenses can be sold (e.g., to enterprises) that allow access to resources and/or services via the network. In such instances, the licenses are often associated with access to a single core device in the network, which can limit an enterprise's flexibility. Moreover, if the core device fails, all the associated licenses and, therefore, access to the network can be dropped (e.g., the network becomes inaccessible to the licensees). In addition, in some such instances, the association of a license with a single core device can present challenges for a pay-as-you-grow licensing model, in which a user or enterprise purchases licenses as needed.

Thus, a need exists for the aggregation and disbursement of licenses in distributed networks that can enable a network device to maintain access to a network in the event of a failure of a core in the network and/or that can facilitate a pay-as-you-grow model for purchasing licenses.

SUMMARY

Apparatus and methods for aggregation and distribution of licenses in a distributed network are described herein. In some embodiments, an apparatus includes an aggregation module that is associated with a first network core and that is configured to be operatively coupled to a second network core and a third network core. The aggregation module is configured to receive a first copy of an access point license that authorizes access to a network via an access point and the second network core. The aggregation module is configured to receive the first copy of the access point license from the second network core in response to an installation and validation of the access point license on the second network core. The aggregation module is configured to send a second copy of the access point license to the third network core that authorizes a device to access the network via the access point and via the third network core in accordance with the access point license and in response to a failure of the second network core.

DETAILED DESCRIPTION

Figure 1:
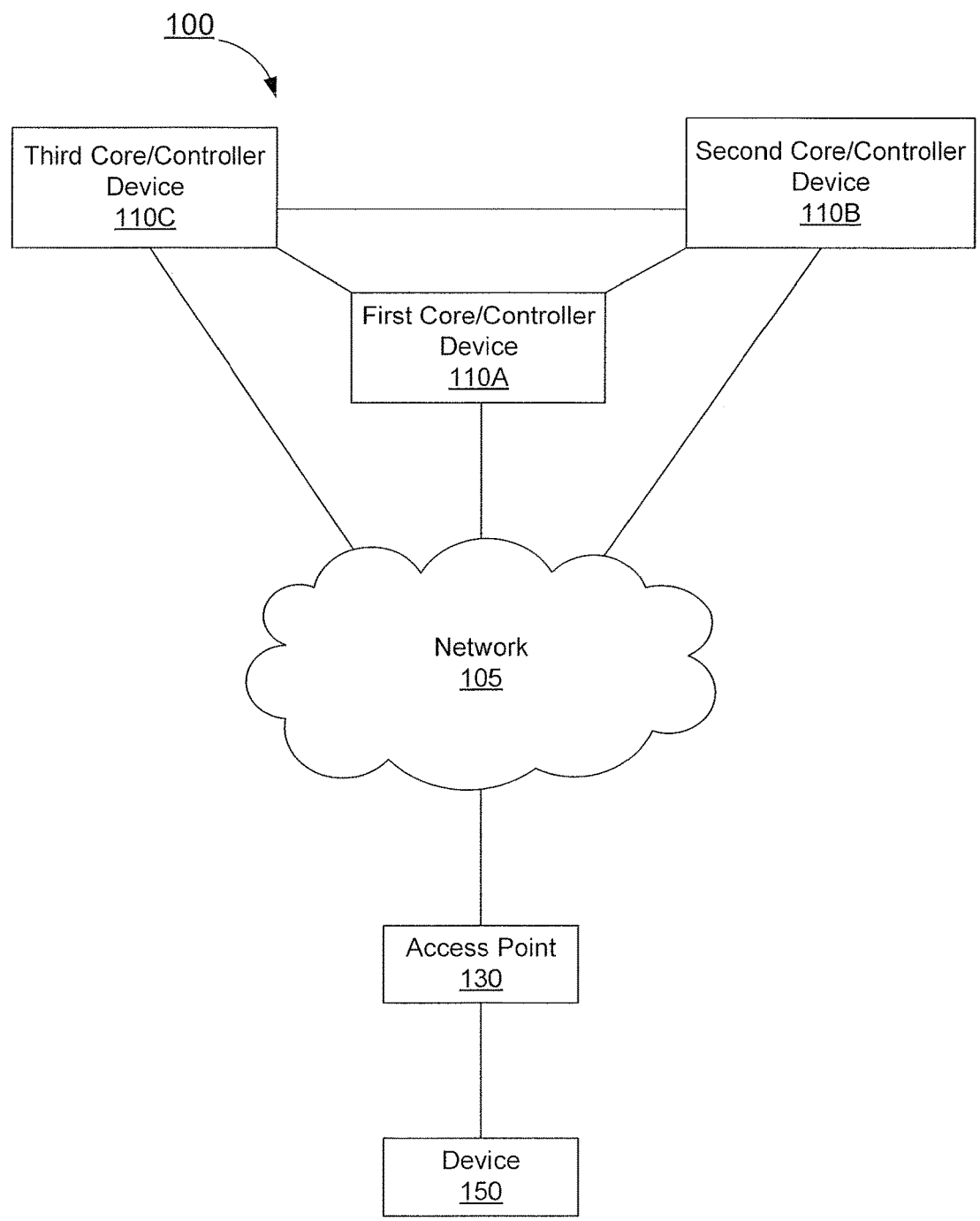
FIG. 1 is schematic illustration of a distributed network, according to an embodiment.

Apparatus and methods for aggregation and distribution of licenses in a distributed network are described herein. In some embodiments, an apparatus includes an aggregation module that is associated with a first network core and that is configured to be operatively coupled to a second network core and a third network core. The aggregation module is configured to receive a first copy of an access point license that authorizes access to a network via an access point and the second network core. The aggregation module is configured to receive the first copy of the access point license from the second network core in response to an installation and validation of the access point license on the second network core. The aggregation module is configured to send a second copy of the access point license to the third network core that authorizes a device to access the network via the access point and via the third network core in accordance with the access point license and in response to a failure of the second network core.

In some embodiments, a first network core is configured to be operatively coupled to a second network core, a third network core, and an access point. The first network core is configured to control access to a network via the access point. The first network core is configured to validate an access point license that authorizes access to the network via the access point in response to the access point license being installed on the first network core. The first network core is configured to send a first copy of the access point license to the second network core and a second copy of the access point license to the third network core to authorize a device to (1) access the network via the access point and via the second network core in accordance with the access point license and in response to a failure of the first network core, or (2) access the network via the access point and via the third network core in accordance with the access point license and in response to a failure of the first network core.

In some embodiments, a method includes receiving, at a first network core from a second network core, a first copy of an access point license that authorize access to a network via an access point and via the second network. The first network core receives the first copy of the access point license from the second network core in response to an installation and validation of the access point license on the second network core. A second copy of the access point license is sent from the first network core to a third network core that authorizes a device to access the network via the access point and via the third network core in accordance with the access point license and in response to a failure of the second network core. The method includes authorizing, at the first network core in response to the failure of the second network core, access to the network by a device via the access point and via the first network core.

As used in this specification, the singular forms "a," "an" and "the" include plural referents unless the context clearly dictates otherwise. Thus, for example, the term "a network" is intended to mean a single network or a combination of networks.

As used herein the term "data processing unit" refers to, for example, any computer, electronic switch, multi-stage switch, switch fabric, portion of a switch fabric, router, host device, data storage device, line card, backplane or the like used to process, transmit and/or convey electrical and/or optical signals. A data processing unit can include, for example, a component included in an electronic communications network. In some embodiments, for example, a data processing unit can be a component included in or forming a portion of a core switch fabric of a data center. In other embodiments, a data processing unit can be an access switch located at an edge of a data center, or a host or peripheral device (e.g., a server) coupled to the access device. For example, an access switch can be located on top of a chassis containing several host devices.

As used herein a "module" can be, for example, any assembly and/or set of operatively-coupled electrical components, and can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

As used herein, the term "license" generally refers to a contract (e.g., a legal contract or a business contract) that can authorize the use of an application or software, can authorize access to a portion of a network that is otherwise inaccessible, and/or the like. For example, a company, administrator, user, and/or the like can purchase a capacity license from a provider that can be represented by a set of instructions that authorizes access to a portion of a network by a given number of devices. In some instances, the license can be represented by, for example, restrictive code that can be indicative of an instruction to limit usage and/or access. For example, in some instances, a company can purchase a seat license that can be represented by instructions or code that can restrict the number of users authorized to access a network (e.g., 1 seat, 10 seats, 100 seats, 1,000 seats, etc.). In some instances, a license can be a combination of a contract (e.g., a legal contract) and restrictive code.

As used in this specification and the appended claims, the terms "copy of a license" generally refers to information associated with and/or otherwise representing a functional replication of original license information. For example, a license can be installed on a first network core which can, in turn, send a signal representing a copy of the license to a second network core. In some instances the copy of the license can be a copy of code representing the license and/or information associated with the license (e.g., not a direct copy of code). In some instances, the copy of the license can include a copy of code representing the license and any suitable additional information.

FIG. 1 is a schematic illustration of a distributed network 100, according to an embodiment. As illustrated, the distributed network 100 includes a first network core/controller device 110A, a second network core/controller device 110B, a third network core/controller device 110C, an access point 130, and a device 150 (e.g., a client device), which are each in communication with a network 105. The components of the distributed network 100 can be interconnected via wired and/or wireless connections, as described in further detail herein. Although the distributed network 100 is shown in FIG. 1 as including three network core/controller devices 110A, 110B, and 110C, one access point 130, and one device 150, in other embodiments, a distributed network can include any number of core devices, access points, and/or devices. Moreover, in some instances, one or more of the components of distributed network 100 can perform one or more tasks described as being performed by another one or more of the components of network 100, as described in further detail herein.

In some embodiments, the distributed network 100 can be included in and/or can form at least a portion of an enterprise network, a cloud network, the Internet, and/or the like. In some embodiments, the distributed network 100 can be arranged to limit access to, for example, a portion of the network 105 (e.g., an intranet, a cloud network, portion of the Internet, and/or any other suitable network or sub-network), via the use of, for example, licenses (e.g., session licenses, capacity licenses, etc.). For example, in some embodiments, an enterprise, administrator, and/or user can purchase and/or otherwise acquire a number of licenses that can authorize access to the portion of the network 105 to a corresponding number of client devices (e.g., the device 150) connected to an access point (e.g., the access point 130) of the distributed network 100

The network 105 can be, for example, a local area network (LAN), a wide area network (WAN), a metropolitan area network (MAN), a worldwide interoperability for microwave access network (WiMAX), a telephone network (such as the Public Switched Telephone Network (PSTN) and/or a Public Land Mobile Network (PLMN)), an intranet, the Internet, an optical fiber (or fiber optic)-based network, a virtual network, a cellular network, and/or any other suitable network. Moreover, the network 105 can be implemented as a wired and/or wireless network. In some embodiments, the network 105 can include one or more networks of any type such as, for example, a LAN and the Internet.

The access point 130 can connect one or more electronic device (e.g., the device 150) to any of the network core/controller devices 110A, 110B, and/or 110C, which can, in turn, connect the access point 130 to any other device (not shown in FIG. 1) in the network 105. For example, the access point 130 can be a router, a switch, a wired and/or wireless access point, a controller, and/or the like. In some embodiments, the access point 130 can include, for example, at least a memory, a processor, and a communication device (each of which is not shown in FIG. 1). The communication device can be any suitable device such as, for example, a network interface card and/or the like that can include one or more ports (e.g., Ethernet ports, etc.) and/or wireless radios. Thus, the communication device of the access point can be arranged to communicate with the network 105 and/or a client device connected thereto (e.g., the device 150). The memory can be, for example, a random access memory (RAM), a memory buffer, a hard drive, a read-only memory (ROM), an erasable programmable read-only memory (EPROM), and/or the like. The processor can be any suitable processing device configured to run or execute a set of instructions or code such as, for example, a general purpose processor (GPU), a central processing unit (CPU), an accelerated processing unit (APU), and application specific integrated circuit (ASIC), a network processor, a front end processor, a field programmable gate array (FPGA), and/or the like. As such, the memory can store instructions to cause the processor to execute modules, processes, and/or functions associated sending and/or receiving one or more signals over the network 105.

The device 150 (e.g., a client device and/or end device) can be, for example, a personal computer (PC), a personal digital assistant (PDA), a smart phone, a laptop, a tablet PC, a video game console, a server device, a network storage device (NAS), a printer, and/or the like. As such, the device 150 includes at least a memory, a processor, and a communication device (each of which is not shown in FIG. 1). The communication device can be, for example, a network interface card and/or the like that can include at least an Ethernet port and/or a wireless radio (e.g., a WiFi® radio, a Bluetooth® radio, etc.). The memory can be, for example, a random access memory (RAM), a memory buffer, a hard drive, a read-only memory (ROM), an erasable programmable read-only memory (EPROM), and/or the like. The processor can be any suitable processing device configured to run or execute a set of instructions or code. For example, the processor can be a general purpose processor (GPU), a central processing unit (CPU), an accelerated processing unit (APU), and/or the like. The processor can be configured to run or execute a set of instructions or code stored in the memory associated with using, for example, a PC application, a mobile application, an internet web browser, a cellular communication, a wireless transmission, a routing operation, a switching operation, and/or the like. In some embodiments, the memory of the device stores instructions to cause the processor to execute modules, processes, and/or functions associated sending and/or receiving one or more signals over the network 105.

The network core/controller devices 110A, 110B, and 110C (also referred to herein as simply "core devices") can each include a device or component having the capability to communicate with other devices, systems, networks, and/or the like. For example, the first core device 110A, the second core device 110B, and the third core device 110C each can be a core router, switch (e.g., an Ethernet switch), network device that provides layer 2 and/or layer 3 functionality, or some other type of communication device that can process and/or forward network traffic, as described in further detail herein. The first core device 110A, the second core device 110B, and the third core device 110C can be substantially similar or the same in form and/or function. In this manner, a discussion of the first core device 110A applies to the second core device 110B and the third core device 110C unless explicitly expressed otherwise. In some embodiments, the distributed network 100 can be arranged such that the first core device 110A, the second core device 110B, or the third core device 110C can be, for example, a control or master core device.

In some instances, the first core device 110A can be configured as a modular chassis of multiple line cards, switch fabrics, and/or data processing units. In other instances, the first core device 110A can be a virtual chassis including multiple line cards, switch fabrics, and/or data processing units. The virtual chassis can be, for example, a group of network devices or data processing units (not shown in FIG. 1) that are interconnected (e.g., in a ring configuration or the like), resulting in a single logical device acting as the first core device 110A. In this manner, the first core device 110A can be implemented as a modular chassis or virtual chassis and can be configured to route, process, transfer, forward, inspect, and/or otherwise manage data sent between devices included in the distributed network 105, as described in further detail herein. In some instances, the core devices 110A, 110B, and 110C can be a combination of a core device and a controller that are arranged in, for example, a collocated configuration. Thus, the first core device 110A can be configured to perform the functions of both a core device and a controller.

Figure 2:
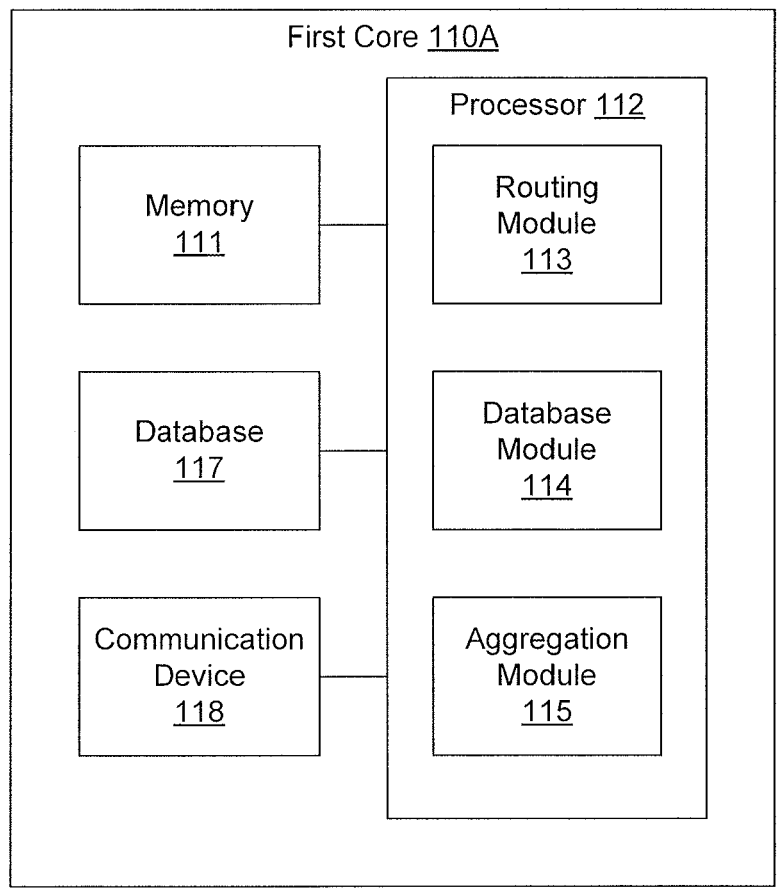
FIG. 2 is a schematic illustration of a core device included in the distributed network of FIG. 1

As shown in FIG. 2, the first core device 110A includes at least a memory 111, a processor 112, a database 117, and a communication device 118. The communication device 118 can be any suitable device that can communicate with the network (e.g., any or the data processing units described above, and/or any combination or part thereof). Moreover, the communication device 118 can include one or more wired and/or wireless interfaces, such as, for example, Ethernet interfaces, optical carrier (OC) interfaces, and/or asynchronous transfer mode (ATM) interfaces. The memory 111 can be, for example, a random access memory (RAM), a memory buffer, a hard drive, a read-only memory (ROM), an erasable programmable read-only memory (EPROM), and/or the like. The database 117 can be, for example, a table, a repository, a relational database, an object-oriented database, an object-relational database, a SQL database, and XML database, and/or the like. In some embodiments, the database 117 can be configured to store data such as, for example, a router table and/or a set of licenses associated with an access point included in the network (e.g., the access point 130), as described in further detail herein.

The processor 112 can be any suitable processing device configured to run or execute a set of instructions or code such as, for example, a general purpose processor (GPU), a central processing unit (CPU), an accelerated processing unit (APU), an application specific integrated circuit (ASIC), a network processor, a front end processor, a field programmable gate array (FPGA), and/or the like. As such, the memory 111 can store instructions to cause the processor 112 to execute modules, processes, and/or functions associated sending, receiving, routing, and/or otherwise managing signals over the network 105. More particularly, the processor 112 can execute modules, processes, and/or functions associated with managing one or more set of licenses associated with, for example, the access point 130.

As shown in FIG. 2, the processor 112 includes a routing module 113, a database module 114, and an aggregation module 115. The routing module 113, the database module 114, and the aggregation module 115 each can be, for example, a hardware module included in the processor 112, a software module stored in the memory 111 and executed in the processor 112, and/or a combination thereof. The routing module 113 of the processor 112 can execute code, processes, instructions, and/or functions to provide, for example, input processing, route lookup, and output processing of data (e.g., data units, data frames, data packets, data cells, etc.). In some embodiments, the routing module 113 can be, for example, a packet forwarding engine or the like. As such, the routing module 113 can perform classification of packets (e.g., for security purposes), policy-based routing, quality of service (QoS) routing, filtering of packets, and/or other forms of packet processing (e.g., packet statistical processing, accounting, and/or encapsulation). In some instances, the routing module 113 can perform such processes and/or other packet processing operations (e.g., packet parsing, packet rewriting, next-hop determinations, K-Tree determinations, and/or firewall determinations) based on code or microinstructions stored, for example, in the memory 111 and/or in the routing module 113. Moreover, the routing module 113 can be in communication with the database module 114 and the aggregation module 115. For example, the routing module 113 can be configured to send a signal to the database module 114 indicative of an instruction to store a data unit in the database 117. Similarly, the routing module 113 can be configured to receive a signal from the aggregation module 115 indicative of an instruction in accordance with one or more licenses, as described in further detail herein.

The database module 114 can execute processes instructions, and/or functions associated with monitoring, updating, and/or querying, the database 117. For example, in some instances, the database module 114 can receive a signal from the routing module 113 indicative of an instruction to query the database 117 to retrieve information associated with a routing table or the like. In other instances, the database module 114 can receive a signal from the routing module 113 indicative of an instruction to update, for example, a routing table stored in the database 117. In such instances, the database module 114 can be configured to send, in response to updating the database 117, a signal associated with the updated database 117 to, for example, the routing module 113. In some instances, the database module 114 can receive a signal from the aggregation module 115 indicative of an instruction to store, update, query, and/or copy, one or more licenses that can be stored in the database 117, as described in further detail herein.

The aggregation module 115 is configured to manage a set of licenses that are associated with one or more access points (e.g., the access point 130 in FIG. 1) included in the distributed network 100 and, based on the licenses, authorize or deny access to, for example, the network 105. More specifically, based on the licenses, the aggregation module 115 can send a signal to the routing module 113 indicative of an instruction to authorize or deny access to the network 105 (or portions of the network 105). For example, an enterprise can purchase a capacity license or the like that can be associated with the access point 130. The license can be represented by and/or implemented according to instructions indicative of a number of devices (e.g., including the device 150) to which access to the network 105 (or portions of the network 105), via the access point 130, is granted. In this manner, the access point 130 can be coupled to and/or otherwise placed in communication with the network 105 (or portions of the network 105) and information representing the license can be sent to the aggregation module 115 of the first core device 110A such that the license and/or the information representing the license is installed on or otherwise stored at the first core device 110A. Said another way, upon receiving the information representing the license, the first core device 110A can connect (or authorize the connection of) the access point 130 to the network 105. In some instances, the aggregation module 115 can send a signal to the database module 114 indicative of an instruction to update the database 117 with the information representing the license. Thus, upon validating the license, the first core device 110A can authorize access to the network 105, via the access point 130, to a number of client devices (e.g., the device 150 and/or the like) in accordance with the capacity license (e.g., 1 seat, 5 seats, 20 seats, 100 seats, 1000 seats, 10000 seats or any number therebetween). As used herein, the terms "license" and "information representing the license" can be used interchangeably. For example, a license can be purchased by an enterprise, a business, an administrator, a user and/or the like and a digital representation of the license can be sent to and/or received by the aggregation module 115. The information representing the license can be, for example, a copy of the license, a license key, a portion of the license, and/or substantially the entire license.

The aggregation module 115 is further configured to copy the information representing the license associated with the access point 130 and to send a copy of the information representing the license to the other core devices included in the distributed network 100. More particularly, the aggregation module 115 of the first core device 110A can make a first copy of the information representing the license associated with the access point 130 and can send the first copy of the information representing the license to the second core device 110B. Similarly, the aggregation module 115 of the first core device 110A can make a second copy of the information representing the license associated with the access point 130 and can send the second copy of the information representing the license to the third core device 110C. In some instances, an aggregation module of the second core device 110B and an aggregation module of the third core device 110C can receive the first copy of the information representing the license and the second copy of the information representing the license, respectively. Upon receipt of the first copy of the information representing the license, the second core device 110B can store the first copy of the information representing the license in its corresponding database; upon receipt of the second copy of the information representing the license, the third core device 110C can store the second copy of the information representing the license in its corresponding database, as described in detail above. Thus, in the event of a failure of the first core device 110A (e.g., the loss of power, a power surge, a hardware malfunction, and/or any other failure that transitions the first core device to an offline state), the access point 130 can maintain access to the network 105 (e.g., without losing connectivity) via the second core device 110B or the third core device 110C and in accordance with the first copy of the information representing the license or the second copy of the information representing the license, respectively.

In some instances, the aggregation module 115 of the first core device 110A can receive a copy of a second license associated with an access point (not shown in FIG. 1) coupled to and/or in communication with the second core device 110B. As such, the aggregation module 115 can send a signal to the database module 114 that is indicative of an instruction to store the copy of the second license in the database 117. Furthermore, the aggregation module 115 can make a second copy of the second license and can send a signal to the third core device 110C associated with the second copy of the second license. Thus, upon receipt, the third core device 110C store the second copy of the second license in its database, as described above. In a similar manner, the aggregation module 115 of the first core device 110A can receive a copy of a third license associated with an access point (not shown in FIG. 1) coupled to and/or in communication with the third core device 110C. Thus, the first core device 110A can store the copy of the third license in the database 117 and can make a second copy of the third license that can be sent to the second core device 110B (in a similar manner as described above). In this manner, the first core device 110A, the second core device 110B, and the third core device 110C can each store (e.g., in a database such as the database 117) a license, a first copy of a license, or a second copy of a license associated with any access point in the distributed network 100. Therefore, if a core device to which an access point is connected fails, any other core device can be configured to authorize connection of the access point to the network, as described above.

Although the first core device 110A is described above as copying each license and sending each copy to the second core device 110B and/or the third core device 110C, in other embodiments, the first core device 110A can aggregate all the licenses received at the aggregation module 115 to define an aggregated license. As such, the first core device 110A can be configured to copy the aggregated license and send the aggregated license to the second core device 110B and the third core device 110C. Upon receipt of the aggregated license, the second core device 110B and the third core device 110C can, for example, update a database or the like to store the aggregated license and/or information associated therewith. In some instances, the first core device 110A can send the aggregated license according to a predetermined schedule or the like.

In some instances, a license can be represented by a set of instructions that can include information associated with one or more time periods during which a core device can authorize access to the network 105, in accordance with a copy of the license. For example, in some instances, with the access point 130 coupled to and/or otherwise in communication with the first core device 110A, the information representing the license can include information indicative of an instruction for the first core device 110A to authorize access to the network 105 (or portions of the network 105) by any suitable number of devices (e.g., in accordance with, for example, a capacity license) connected to the access point 130 until such a time that the license is invalidated (e.g., the end of a subscription or the like). In response to a failure of the first core device 110A, however, the first copy or the second copy of the license stored on or by the second core device 110B or the third core device 110C, respectively, can include information indicative of an instruction for the second core device 110B or the third core device 110C to authorize access to the network 105 (or portions of the network 105) by any suitable number of devices connected to the access point 130 for a predetermined time period. In this manner and in accordance with the first copy or second copy of the license, any number of devices, as authorized by the license, can connect to and/or disconnect from the network 105 (via the access point 130) for the predetermined time period. Thus, during the predetermined time period (e.g., a grace period) the devices can connect to and/or disconnect from the network 105 in substantially the same manner (except via a different core device) in which the devices connected and/or disconnected prior to the failure of the first core device 110A.

In some instances, the first copy or the second copy of the license can include information indicative of instructions such that after the predetermined time period, the second core device 110B or the third core device 110C, respectively, to which the access point 130 is connected can be configured to deny access to the network 105 by any additional device other than those all ready connected (or otherwise authorized). Similarly stated, the core device 110B or 110C can be configured to continue authorization of the connection between the devices and the network 105 (via the access point 130) after the predetermined time period has elapsed while the core device 110B or 110C can be further configured to deny access to the network 105 by any additional device not all ready connected (e.g., connected devices are "grandfathered" in).

In some instances, the connected devices can access the network 105 via the access point 130 and the core device 110B or 110C for a second predetermined time period after which the core device 110B or 110C denies access to the network 105 by any device connected to the access point 130. Furthermore, during the second predetermined time period, if a connected device disconnects from the network 105, the core device 110B or 110C can deny subsequent access to that device. Therefore, if the first core device 110A is once again placed in communication with the network 105 (e.g., repaired or otherwise brought back online), the devices that were previously authorized to access the network 105 in accordance with the first copy of the license or the second copy of the license can be placed in communication with the first core device 110A (via the access point 130) and, in turn, the first core device 110A can be configured to authorize access to the network 105 by the devices (e.g., the device 150) in accordance with the license (i.e., not the first copy of the license or the second copy of the license). Thus, bandwidth across the core devices 110A, 110B, and 110C can be rebalanced. In some instances, at the end of the second predetermined time period the license and the copies of the licenses can expire and thus, the enterprise, business, administrator, user, and/or the like can purchase a new license associated with an authorization to access the network 105. In some instances, the licenses and/or information associated with the licenses can include instructions that can cause the core device 110B or 110C to delete the copy of the license at the end of the second predetermined time period.

Although the first core device 110A is described above as receiving the copies of the licenses and subsequently making a second copy of the licenses, in other embodiments, any of the core devices 110A, 110B, and/or 110C can be configured to make the second copies of the licenses. In other words, any of the core devices 110A, 110B, and/or 110C can be a master core device. In other embodiments, a core device can be configured to make a copy of a license for each core device included in a distributed network and can send a copy of the license to each core device rather than each additional copy of the license being sent from the master core device to the other core devices. In some embodiments, the core devices can be configured to delete, remove, disassociate, and/or otherwise invalidate duplicate copies of one or more licenses.

Figure 3:
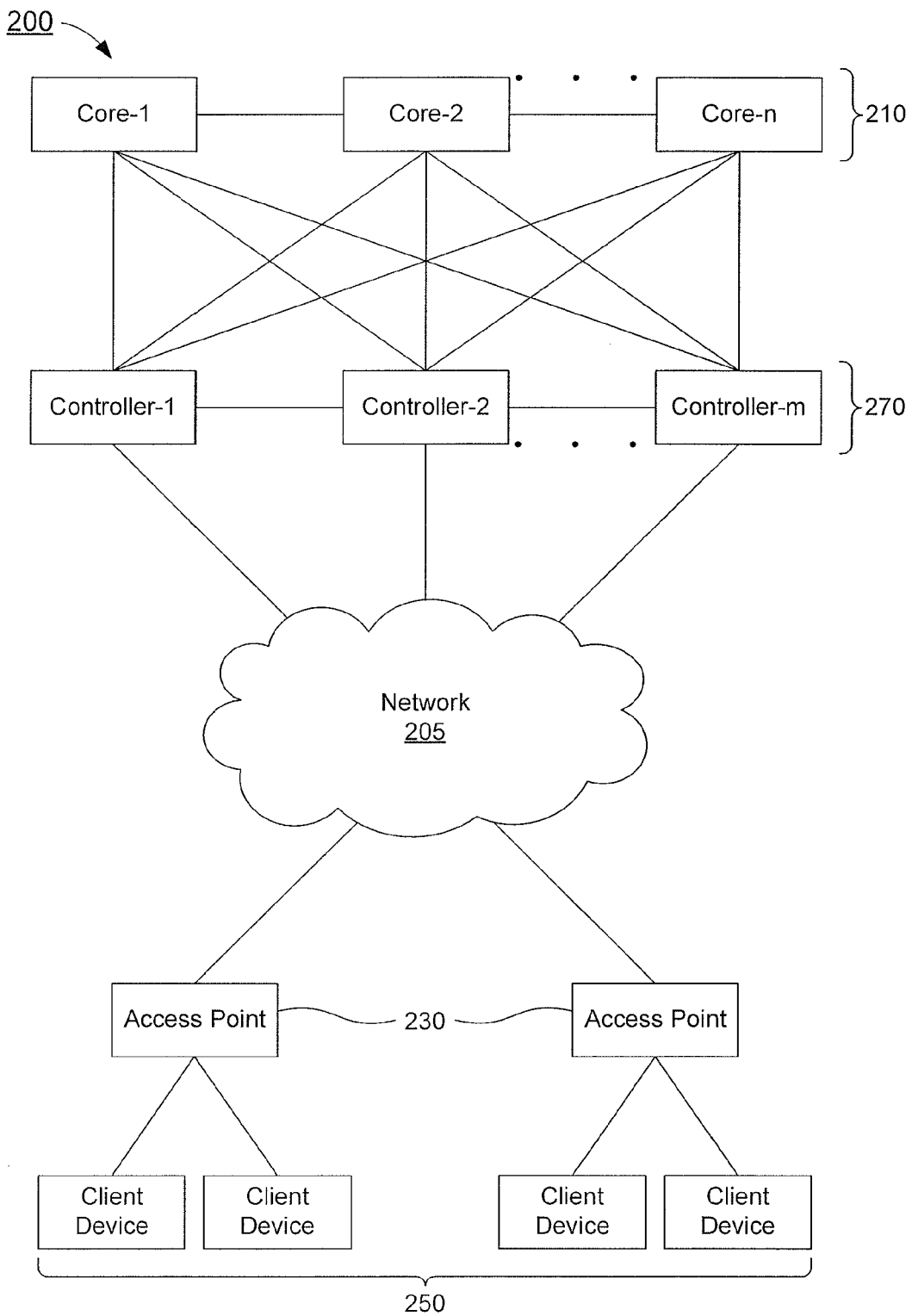
FIG. 3 is a schematic illustration of a distributed network, according to another embodiment.

FIG. 3 is a schematic illustration of a distributed network 200, according to another embodiment. As illustrated, the distributed network 200 includes any number of core network devices 210 and any number of controllers 270 that are in communication with a set of access points 230, via a network 205. Each access point 230 is connected to a set of client devices 250. The distributed network 200 can be substantially similar in function as the distributed network 100 described above with reference to FIG. 1. For example, the core devices 270, the access points 230, the client devices 250, and the network 205 can each be substantially similar to the core devices 110A, 110B, and/or 110C, the access point 130, the device 150, and the network 105, respectively, described above with reference to FIGS. 1 and 2. Thus, aspects of the distributed network 200 are not described in further detail herein. The distributed network 200 can differ from the distributed network 100, however, with the inclusion of the controllers 270. Moreover, while the distributed network 100 is shown and described above as including a specific number of components (e.g., the core devices 110A, 110B, and 110C, the access point 130, and the device 150), the distributed network 200 can include any number of core devices 210 (indicated in FIG. 3 as the ellipsis and the arbitrarily numbered core "Core-n") and any number of controllers 270 (indicated in FIG. 3 as the ellipsis and the arbitrarily numbered core "Controller-m").

The controllers 270 can be any suitable network device such as, for example, a compute device, and/or the like that is configured to provide, for example, central processing unit (CPU) processing and/or logic. As such, the controllers 270 can each include at least a memory, a processor, and a communication device. The communication device can be any suitable device such as, for example, a network interface card and/or the like that can include one or more ports (e.g., Ethernet ports, etc.) and/or wireless radios. Thus, the communication device of the controllers 270 can be arranged to communicate with the network 205, the core devices 210, and the access points 230. For example, each of the controllers 270 can be a compute device that can be connected (e.g., via an Ethernet port) to any number of access points 230 (e.g., 10 access points) and one or more core devices 270. The memory can be, for example, a random access memory (RAM), a memory buffer, a hard drive, a read-only memory (ROM), an erasable programmable read-only memory (EPROM), and/or the like. The processor can be any suitable processing device configured to run or execute a set of instructions or code such as, for example, a general purpose processor (GPU), a central processing unit (CPU), an accelerated processing unit (APU), and application specific integrated circuit (ASIC), a network processor, a front end processor, a field programmable gate array (FPGA), and/or the like. As such, the memory can store instructions to cause the processor to execute modules, processes, and/or functions associated sending and/or receiving one or more signals over the network 205. While described above as being controllers 270, in other embodiments, the distributed network 200 can include aggregation switches and/or the like that can be configured to couple the core devices 210 to the network 205.

As described above, in some instances, a license can be purchased (e.g., a capacity or session license) that is associated with a number of client devices 250 that can gain access to the network 205 via one of the access points 230. In this manner, the access point 230 can be coupled to and/or placed in communication with, for example, one of the controllers 270 and, in turn, the controller 270 can send a signal associated with the license to one of the core devices 210 such that the license and/or information representing the license is installed on and/or otherwise stored at that core device 210. Thus, the core device 210 can be configured to authorize a number of client devices 250, in accordance with the license, to access the network 205 via the access point 230, the controller 270 and the core device 210.

A core device 210 can further be configured to make any number of copies of the license associated with the access point 230 and the controller 270 and, once copied, send a copy of the license to the other core devices 210 included in the distributed network 200, as described in detail above. Upon receipt of the copy of the license, each receiving core device 210 can store the copy of the license in its corresponding database. Thus, in the event of a failure of the core device 210 that received the original license (e.g., a loss of power, a power surge, a hardware malfunction, and/or any other failure that transitions the first core device to an offline state), the controller 270 can maintain access to the network 205 (e.g., without losing connectivity) via any other core device 210. In addition, any access point 230 coupled to and/or in communication with that controller 270 can maintain access to the network 205 via the other core device 210, as described in detail above with reference to FIGS. 1 and 2. Moreover, by managing the licenses at the core devices 210, the amount of licenses can be reduced due, at least in part, to the hierarchal arrangement of the distributed network 200.

Figure 4:
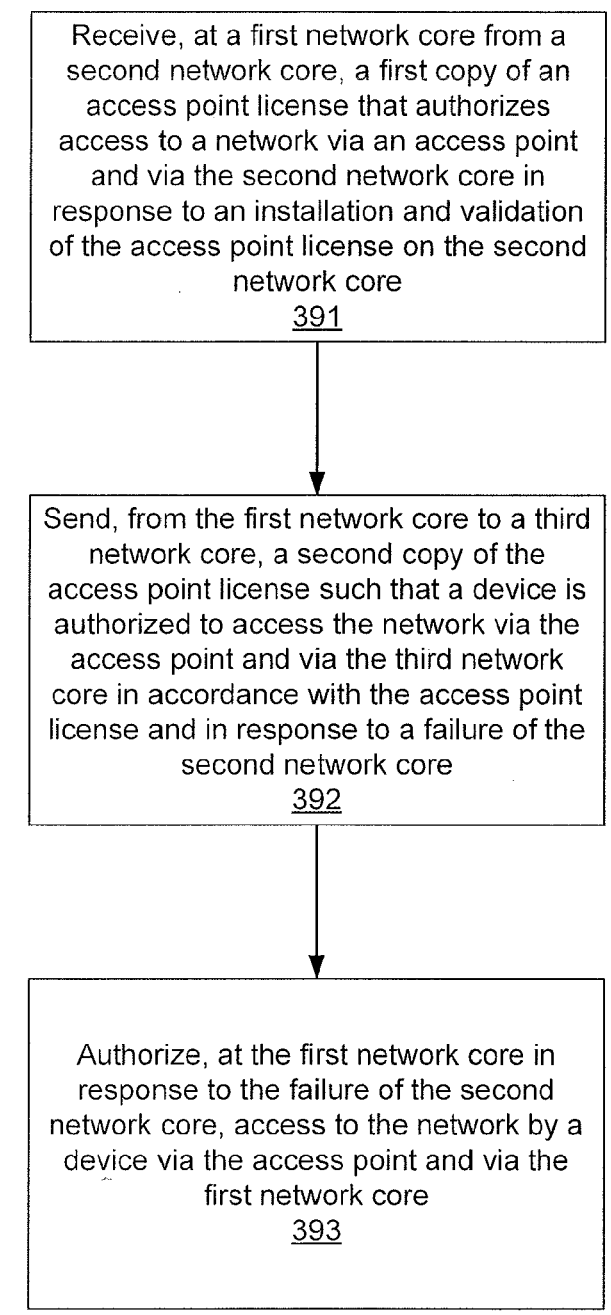
FIG. 4 is a flowchart illustrating a method for the aggregation and disbursement of licenses in a distributed network, according to an embodiment.

FIG. 4 is a flowchart illustrating a method 390 for the aggregation and disbursement of licenses in a distributed network (e.g., the distributed network 100 and/or 200 described above), according to an embodiment. The method 390 includes receiving, at a first network core and from a second network core, a first copy of an access point license that authorizes access to a network via an access point and via the second network core in response to an installation and validation of the access point license on the second network core, at 391. For example, in some embodiments, a user, a business, an administrator, an enterprise, etc. can purchase a license (e.g., a capacity and/or session license) that can be represented by and/or be implemented in accordance with instructions that are associated with authorizing access to the network by a number of devices connected to the access point. As such the access point can be coupled to and/or placed in communication with the second network core which can, in turn, receive the license and/or information representing the license to authorize network access to the number of devices. In addition, the second network core can copy the license and send the copy of the license to the first network core.

In some embodiments, the first network core can be a master core device or the like that can include an aggregation module such as the aggregation module 115 of the first core device 110 of FIG. 1. In such embodiments, the aggregation module can be configured to receive the copy of the license and, upon receipt, can update a database (e.g., substantially similar to or the same as the database 117 described above with reference to FIG. 2) with the copy of the license. Furthermore, the first network core (e.g., the aggregation module) can make a second copy of the license.

The second copy of the access point license is sent from the first network core to a third network core such that a device is authorized to access the network via the third network core in accordance with the access point license and in response to a failure of the second network core, at 392. For example, in some instances, the second network core can lose power, connectivity, and/or any other failure that transitions the second network core to an offline status. In such instances, the second network core cannot provide authorization and/or validation of the access point license. With the second copy of the access point license received and stored at the third network core, however, the device can maintain connectivity with the network via the access point and the third network core, in accordance with the second copy of the access point license. In response to the failure of the second network core, the first network core also authorizes access to the network by a device via the access point and via the first network core, at 393. As such, the first network core and the second network core can be configured to authorize access to the network by any device connected to the access point in accordance with the access point license and in response to a failure of the second network core.

Although the embodiments and methods are described herein as being configured to add, copy, and/or aggregate licenses (i.e., increasing the number of licenses and/or copies of license), any of the embodiments described herein can be configured to delete licenses and/or information representing a copy of a license. For example, in some instances, an administrator or the like can manipulate a compute device to send a signal, indicative of instructions to delete information associated with a license, to a core device on which the license is installed. In this manner, the core device (and more particularly, a processor of the core device) can execute a set of instructions that can result in the license being deleted from, for example, a memory of the core device. Moreover, the core device can send a signal to any other core device operably coupled thereto that is associated with instructions to cause a processor of the other core devices to delete a copy of the license and/or information representing a copy of the licenses. Thus, the embodiments described herein can be configured to remove, delete, and/or otherwise disassociate from a license or a copy of a license in similar manners as those described above.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

What is claimed is:

1. An apparatus, comprising:
    an aggregation module associated with a first network core and configured to be operatively coupled to a second network core and a third network core,
    the aggregation module configured to receive a first copy of a first access point license that authorizes access to a network via a first access point and via the second network core, the aggregation module configured to receive the first copy of the first access point license from the second network core in response to an installation and validation of the first access point license on the second network core,
    the aggregation module configured to send a second copy of the first access point license to the third network core such that a first device is authorized to access the network via the first access point and via the third network core in accordance with the first access point license in response to a failure of the second network core,
    the aggregation module configured to send a third copy of the first access point license to the second network core,
    the aggregation module configured to receive a first copy of a second access point license that authorizes access to the network via a second access point and via the third network core, the aggregation module configured to receive the first copy of the second access point license from the third network core in response to an installation and validation of the second access point license on the third network core, and
    the aggregation module configured to send a second copy of the second access point license to the second network core such that a second device is authorized to access the network via the second access point and via the second network core in accordance with the second access point license in response to a failure of the third network core.

2. The apparatus of claim 1, wherein:
    the aggregation module is configured to store the first copy of the first access point license such that a third device is authorized to access the network via the first access point and via the first network core in accordance with the first access point license in response to the failure of the second network core.

3. The apparatus of claim 1, wherein the aggregation module is configured to send the second copy of the first access point license such that the first device is authorized (1) to access the network via the first access point and via the third network core for a first period of time in response to the failure of the second network core and (2) to continuing access to the network via the first access point and via the third network core for a second period of time subsequent to the first period of time.

4. The apparatus of claim 1, wherein:
    the aggregation module is configured to validate a third access point license that authorizes access to the network via a third access point and via the first network core in response to the third access point license being installed on the first network core,
    the aggregation module is configured to send a first copy of the third access point license to the second network core and a second copy of the third access point license to the third network core such that a third device is authorized (1) to access the network via the third access point and via the second network core in accordance with the third access point license and in response to a failure of the first network core, and (2) to access the network via the third access point and via the third network core in accordance with the third access point license and in response to the failure of the first network core.

5. The apparatus of claim 1, wherein the first access point license is a capacity license.

6. The apparatus of claim 1, wherein the first access point is a wireless access point.

7. The apparatus of claim 1, wherein the aggregation module is configured to send the second copy of the first access point license such that (1) the first device is authorized to access the network via the first access point and via the third network core for a first period of time in accordance with the first access point license and in response to the failure of the second network core, (2) the first device is denied to access the network via the first access point and via the third network core after the first period of time, and (3) the first device is authorized to access the network via the first access point and via the second network core in accordance with the first access point license after the second network core is recovered from the failure of the second network core.

8. An apparatus, comprising:
    a first network core configured to be operatively coupled to a second network core, a third network core, and a first access point, the first network core configured to control access to a network via the first access point, the first network core configured to validate a first access point license that authorizes access to the network via the first access point in response to the first access point license being installed on the first network core, the first network core configured to send a first copy of the first access point license to the second network core and a second copy of the first access point license to the third network core such that a first device is authorized to access (1) the network via the first access point and via the second network core in accordance with the first access point license in response to a failure of the first network core, and (2) the network via the first access point and via the third network core in accordance with the first access point license in response to the failure of the first network core, the first network core configured to receive a third copy of the first access point license from the second network core, the first network core configured to receive a first copy of a second access point license that authorizes access to the network via a second access point and via the second network core, the first network core configured to receive the first copy of the second access point license from the second network core in response to an installation and validation of the second access point license on the second network core, and the first network core configured to send a second copy of the second access point license to the third network core such that a second device is authorized to access the network via the second access point and via the third network core in accordance with the second access point license in response to a failure of the second network core.

9. The apparatus of claim 8, wherein:
the first network core is configured to authorize, in response to the failure of the second network core, access to the network by the second device via the second access point and via the first network core.

10. The apparatus of claim 8, wherein the first access point is a wired access point and the second access point is a wireless access point.

11. The apparatus of claim 8, the first network core configured to authorize access to the network by the first device.

12. The apparatus of claim 8, wherein the first access point license is a session license.

13. A method, comprising:
receiving, at a first network core from a second network core, a first copy of a first access point license that authorizes access to a network via a first access point and via the second network core, the first network core is configured to receive the first copy of the first access point license from the second network core in response to an installation and validation of the first access point license on the second network core;

sending, from the first network core to a third network core, a second copy of the first access point license such that a first device is authorized to access the network via the first access point and via the third network core in accordance with the first access point license in response to a failure of the second network core;

authorizing, at the first network core in response to the failure of the second network core, access to the network by a second device via the first access point and via the first network core;

sending, from the first network core, a third copy of the first access point license to the second network core;

receiving, at the first network core from the third network core, a first copy of a second access point license that authorizes access to the network via a second access point and via the third network core, the first network core receiving the first copy of the second access point license in response to an installation and validation of the second access point license on the third network core; and sending, from the first network core to the second network core, a second copy of the second access point license such that a third device is authorized to access the network via the second access point and via the second network core in accordance with the second access point license in response to a failure of the third network core.

14. The method of claim 13, further comprising:
validating a third access point license that authorizes access to the network via a third access point in response to the third access point license being installed on the first network core; and sending, in response to the validating, a copy of the third access point license to the third network core such that a fourth device is authorized to access the network via the third access point and via the third network core in response to a failure of the first network core.

15. The method of claim 13, further comprising sending the second copy of the first access point license such that the first device is authorized (1) to access the network via the first access point and via the first network core for a first period of time in response to the failure of the second network core and (2) to continuing access to the network via the first access point and via first network core for a second period of time subsequent to the first period of time.

16. The method of claim 13, further comprising, not authorizing access, by a fourth device, to the network via the first access point and via the first network core, when a grace period associated with the first access point license has expired.

17. The method of claim 13, wherein the first access point is an aggregation switch.

18. The method of claim 13, wherein the first access point license is a capacity license.

* * * * *